United States Patent Office 3,366,690
Patented Jan. 30, 1968

3,366,690
PRODUCTION OF NINHYDRIN
Louis L. Wood, Washington, D.C., assignor to W. R. Grace & Co., a corporation of Connecticut
No Drawing. Filed June 7, 1966, Ser. No. 555,707
3 Claims. (Cl. 260—590)

ABSTRACT OF THE DISCLOSURE

This invention is directed to a process for preparing ninhydrin from hydrindantin by reacting the hydrindantin with aqueous nitric acid and recovering the thus formed ninhydrin.

---

The present invention relates to the manufacture of ninhydrin, and more specifically to a novel procedure for obtaining good yields of ninhydrin from readily available and relatively inexpensive raw materials.

The prior art discloses numerous procedures for preparing ninhydrin, i.e., 1,2,3-indantrione hydrate. The great majority of these prior art techniques require the use of relatively expensive intermediates and/or reactants, and therefore cannot be effectively practiced on a commercial scale.

It is therefore an object of the present invention to provide a novel method for producing ninhydrin from inexpensive raw materials.

It is a further object to provide a commercially feasible route by which large quantities of ninhydrin may be economically produced.

These and still furhter objects of the present invention will become relatively apparent to one skilled in the art of following detailed description and specific examples.

Broadly, I have found that commercial grade hydrindantin may be readily oxidized to ninhydrin with aqueous nitric acid solution.

More specifically, my present invention contemplates a method for producing ninhydrin which involves oxidizing commercially available hydrindantin with nitric acid in an aqueous medium at a temperature from about 0° to 100° C., and recovering the ninhydrin formed thereby.

The hydrindantin used in the practice of the invention is readily available on a commercial scale. This commercial product is generally sufficiently pure for use in my procedure.

The reaction is preferably performed by first forming a slurry of hydrindantin in a solution which comprises water and nitric acid. The slurry is stirred until a homogeneous aqueous solution is formed. Subsequently, the solution may be cooled or evaporated to cause precipitation of the desired ninhydrin product. The ninhydrin may then be removed from the reaction mixture by filtration.

The aqueous nitric acid solution used to form the present slurry contains from about 0.01 to about 1.0 mole of nitric acid dissolved in each liter of water. This solution is used in amounts varying from about 0.1 to about 2.0 liters per mole of hydrindantin present in the slurry.

The reaction is preferably carried out at a temperature from about 0° to 100° C. and generally requires from about 5 minutes to about 48 hours to reach completion. Completion of the reaction is readily indicated by the fact that the solid hydrindantin disappears from the slurry and a homogeneous solution of ninhydrin forms.

In a preferred embodiment of this invention at least ⅔ mole of nitric acid is reacted per mole of hydrindantin.

Recovery of the desired ninhydrin is readily achieved by either cooling or evaporating the solution until precipitation of the desired ninhydrin product occurs. The ninhydrin may then be subjected to further crystallizations to obtain a product having the required purity.

Having described the basic aspects of the present invention, the following examples are given to illustrate embodiments thereof:

EXAMPLE

The reactions tabulated below were run in a flask fitted with a thermometer, mechanical stirrer, and condenser. The reaction was run for periods of about 50 to 60 min-

| Example | Hydrindantin .2 H₂O (g.) | H₂O (ml.) | 70% HNO₃ (g.) | Temp. (° C.) | Time (min.) | Yield Ninhydrin | |
|---|---|---|---|---|---|---|---|
| | | | | | | (G.) | (Percent) |
| 1 | 35.8 | 100 | 20 | 70–80 | 15 | 32.2 | 90.5 |
| 2 | 35.8 | 100 | 10 | 75–80 | 25 | 32.4 | 91.0 |
| 3 | 35.8 | 100 | 5 | 75–80 | 60 | 28.1 | 79.0 |

The reaction which occurs during the above defined novel process may be outlined by the following equation:

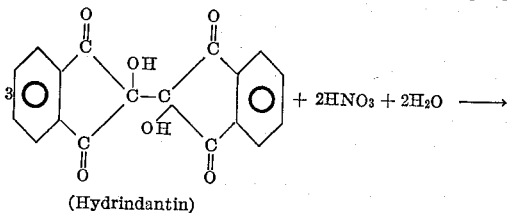
(Hydrindantin) + 2HNO₃ + 2H₂O ⟶

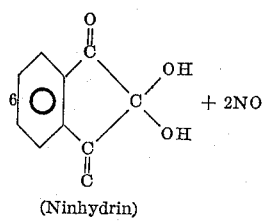
(Ninhydrin) + 2NO utes whereupon it was found that solution of the hydrindantin was complete. All the reactions products were filtered free of solids at the end of the reaction and ninhydrin was precipitated by cooling the filtrate to 0° C. The ninhydrin was collected by filtration to obtain pale yellow crystals which melted at 240–245° C. and which possess an infra-red spectrum identical to those on authentic samples of ninhydrin.

The above examples clearly illustrate that substantial yields of ninhydrin may be obtained from hydrindantin using the procedure set forth above.

I claim:
1. A method for preparing ninhydrin which comprises reacting hydrindantin with an aqueous nitric acid solution, wherein said aqueous solution contains from about 0.01 to about 1.0 mole of nitric acid per 1 liter of water, and wherein said reaction is conducted at a temperature of about 0–100° C. and recovering the ninhydrin formed thereby.

2. The method of claim 1 wherein at least ⅔ mole of nitric acid is reacted per 1 mole of hydrindantin.

3. The method of claim 1 wherein from about 0.1 to about 2.0 liters of aqueous nitric acid are present per mole of hydrindantin.

References Cited

Ruhemann: J. Chem. Soc., 99, 792–800 (1911).

DANIEL D. HORWITZ, *Primary Examiner.*